United States Patent [19]
Nichols et al.

[11] 3,866,259
[45] Feb. 18, 1975

[54] WINDSHIELD WIPER BLADE CONNECTOR

[75] Inventors: Elton F. Nichols, Franklin, Mich.;
John P. Moorhead, Palos Verdes Estates, Calif.; Leo J. Wubbe, Beverly Shores, Ind.

[73] Assignee: The Anderson Company, Gary, Ind.

[22] Filed: Dec. 4, 1972

[21] Appl. No.: 312,209

[52] U.S. Cl. ............................................ 15/250.32
[51] Int. Cl. ............................................ B60s 1/40
[58] Field of Search .................... 15/250.31, 250.32

[56] References Cited
UNITED STATES PATENTS

| | | | |
|---|---|---|---|
| 3,378,874 | 4/1968 | Scinta | 15/250.32 |
| 3,588,942 | 6/1971 | Schlesinger | 15/250.32 |
| 3,641,614 | 2/1972 | Newsome | 15/250.32 |
| 3,750,227 | 8/1973 | Hayhurst et al. | 15/250.32 |

FOREIGN PATENTS OR APPLICATIONS

| | | | |
|---|---|---|---|
| 1,281,894 | 12/1961 | France | 15/250.32 |

Primary Examiner—Harvey C. Hornsby
Assistant Examiner—C. K. Moore
Attorney, Agent, or Firm—Wegner, Stellman, McCord, Wiles & Wood

[57] ABSTRACT

An automobile windshield wiper blade assembly releasably mountable on the side of a windshield wiper arm having a laterally extending tip with a reduced central portion between enlarged ends, comprising, a wiper yoke member having a channel-shaped cross section with aligned apertures for receiving the enlarged ends of the laterally extending tip, a mounting block secured in the yoke member adjacent the apertures, and a U-shaped wire spring having parallel legs secured to the mounting block and yieldably engaging the reduced portion of the laterally extending tip for releasably holding the yoke member on the tip.

3 Claims, 5 Drawing Figures

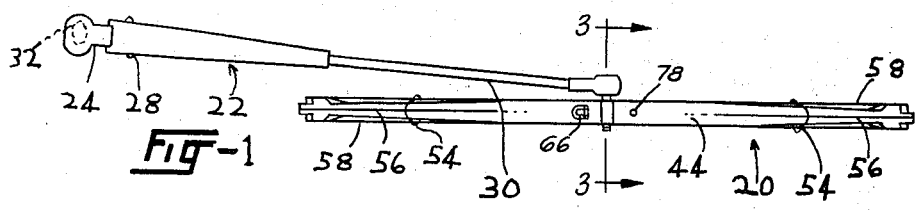
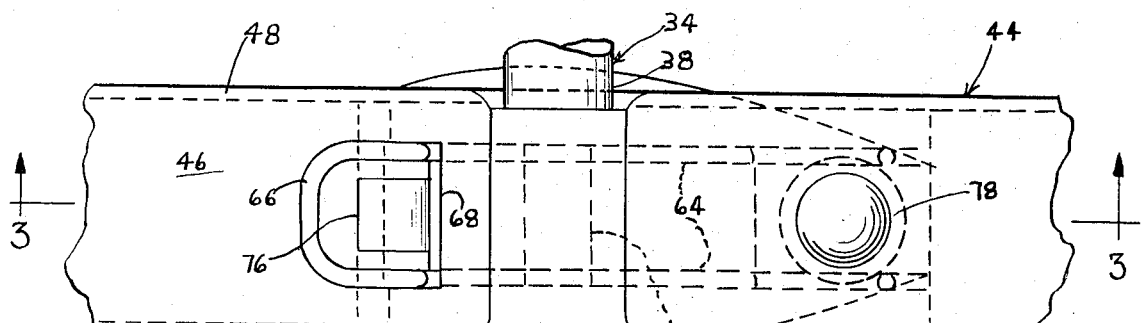
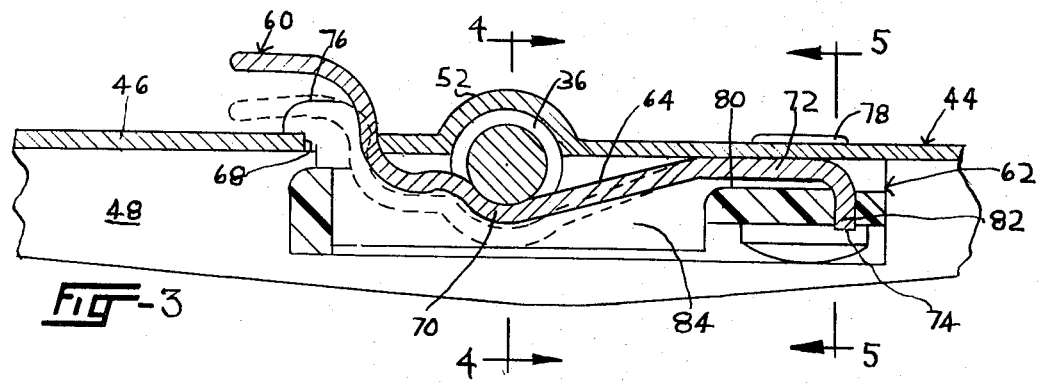
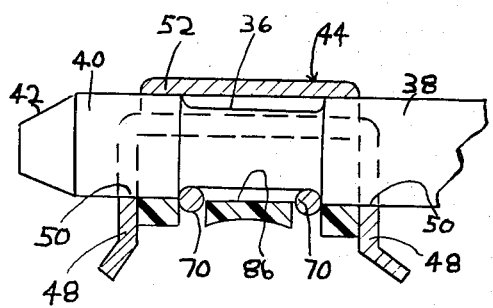
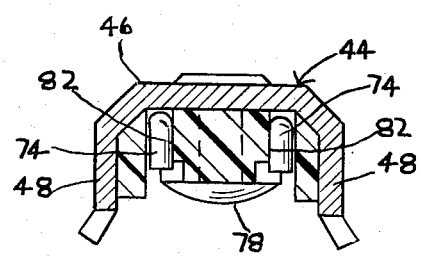

WINDSHIELD WIPER BLADE CONNECTOR

BACKGROUND OF THE INVENTION

This invention relates to a side mounted windshield wiper blade assembly releasably attachable to the side of a windshield wiper arm so as to provide a low silhoutte which facilitates concealment of the wiper structure in the parked position in a recess in the cowl of an automobile.

Side mounted wiper blades have been proposed in the past as shown in prior U.S. Pat. Nos. 3,378,874 and 3,588,941, for example. In such constructions, it is desirable to provide a releasable connection between the wiper blade assembly and the wiper arm which will facilitate removal of a used wiper blade and replacement with a new blade. For such purposes, it has been conventional to provide a laterally extending tip on the wiper driving arm with a reduced central portion between enlarged ends for receiving a releasable spring in a yoke or bridge member. However, in some prior art constructions, during mounting of the wiper blade assembly on the top of the driving arm, an inexperienced attendant may hear a click or feel a snap when the tip of the driving arm is only partially inserted into the wiper assembly, and then incorrectly assume that the wiper blade assembly is properly mounted. As a result of such misleading signals, the wiper blade assembly may be left imporperly mounted on the wiper arm and thereafter become disconnected and lost during use. It is desirable to provide a fail-safe connection which will retain the wiper blade assembly on the wiper driving arm even if the attachment may not be completed at the factory or by the service station attendant.

SUMMARY OF THE PRESENT INVENTION

The present invention relates to a new and improved windshield wiper blade assembly for connecting a pressure distributing wiper bridge member to the side of a windshield wiper arm having a laterally extending tip with a reduced central portion between enlarged ends, wherein the bridge member has parallel sides with aligned apertures for supporting the enlarged ends of the laterally extending tip, and spring means for releasably holding the bridge member on the tip in the form of a pair of spaced parallel spring members for yieldably engaging the reduced portion of the tip, in a manner such that one of the spring members will be effective to hold the bridge member on the tip in the event that the tip is not completely inserted into the apertures on the bridge member.

It is a general object of the invention to provide a fail-safe wiper blade assembly of the type described including a wiper bridge member with a pair of wire spring members releasably engageable with a reduced portion on a wiper driving arm, in an arrangement such that one of the spring members will retain the wiper blade assembly on the wiper arm in the event that the blade assembly is not completely attached to the wiper driving arm.

Preferably, the wiper blade assembly includes a pressure distributing wiper bridge member having a channel-shaped mid portion with parallel sides having aligned apertures for enlarged ends of the tip of the wiper driving arm, a mounting block secured to the bridge member adjacent the apertures, and a U-shaped wire spring having parallel legs with free ends secured in the mounting block, mid portions bearing on the reduced portion of the tip, and a connecting cross piece at the opposite end for depressing the spring to release the tip for removal of the bridge member.

In the preferred construction illustrated herein, the mounting block has spaced parallel grooves receiving mid portions of the spring legs to restrict lateral motion of the legs. The mounting block has a latch finger engaging an opening in the bridge member for securing one end of the block to the bridge member.

In order to provide for retention of the wiper blade assembly on the wiper driving arm tip in the event of only partial attachment of the wiper blade assembly to the driving arm, the spring legs are spaced apart to engage the reduced central portion of the tip of the wiper driving arm, near opposite ends of the reduced portion, and the outboard enlarged end of the tip has a length approximately equal to the spacing between the spring legs, so that the outboard end may be trapped between the wires in the event that the tip is only partially inserted in the bridge member.

In order to securely mount the U-shaped spring wire on the wiper blade assembly, the mounting block has a pair of spaced parallel grooves at one end holding the free ends of the spring in captivity between the block and the bridge member, together with a pair of apertures intersecting the grooves respectively for receiving bent ends of the legs of the spring.

BRIEF DESCRIPTION OF THE DRAWINGS

FIG. 1 is a plan view of a windshield wiper arm with a detachable wiper blade assembly embodying the principles of the present invention;

FIG. 2 is a fragmentary enlarged plan view of a central portion of the wiper blade assembly illustrated in FIG. 1;

FIG. 3 is a longitudinal sectional view, taken at about the line 3—3 of FIG. 2;

FIG. 4 is a transverse sectional view taken at about the line 4—4 of FIG. 3; and FIG. 5 is a transverse sectional view taken at about the line 5—5 of FIG. 3.

DETAILED DESCRIPTION OF PREFERRED EMBODIMENT

Referring to the drawings in more detail, a windshield wiper blade assembly 20 embodying the principles of the present invention is illustrated in conjunction with the windshield wiper driving arm generally designated 22, including a hollow head portion 24, channel-shaped intermediate portion 26 pivotally mounted on the head portion at 28, and an end portion 30 extending rigidly from the intermediate portion 26. The head portion 24 engages a driving gear 32 associated with a wiper driving motor (not shown) in a manner to oscillate the wiper driving arm 22 back and forth about the axis of the gear 32 in an arc on the order of 90°–135°, depending upon the particular installation. At the free end of the wiper arm extension 30, it is provided with a laterally extending tip 34 rigidly secured to the extension 30 to facilitate releasable attachment of the side mounted wiper blade assembly 20. The tip 34 includes a reduced central portion 36 disposed between enlarged opposite end portions including an inboard end portion 38 and an outboard end portion 40 which has a tapered terminus 42.

The wiper blade assembly 20 includes an elongated pressure distributing primary yoke member or bridge member 44 which has a channel-shaped central portion including an upper crosspiece 46 and depending sides 48 with aligned apertures 50 (FIG. 4) for supporting the end portions 38 and 40 on the tip of the wiper driving arm. Additional bearing support for the enlarged tip portions 38 and 40 is provided by a rounded upper portion 52 in the crosspiece 46 of the bridge member 44.

At each end, the primary yoke or bridge member 44 is pivotally connected as at 54 to the central portion of a secondary yoke 56. In turn, opposite ends of the secondary yokes 56 are formed to engage spaced portions of a wiper blade 58 including a flexible edge portion for cleaning a windshield surface.

In order to releasably attach the wiper blade assembly 20 to the tip 34 of the wiper driving arm, a U-shaped wire spring member 60 is secured to the primary bridge member 44 by means of a mounting block 62. The U-shaped spring member 60 includes parallel leg portions 64 connected by a crosspiece 66. The major portion of each leg portion 64 is disposed within the channel-shaped mid portion of the bridge member 44, while the end portions of the legs 64 adjacent the crosspiece 66 project outwardly through an aperture 68 in the bridge member 44, so that the end portion 66 is manually accessible for manipulating the spring member. Each leg 64 has a curved portion 70 adapted to normally yieldably engage the reduced central portion 36 of the tip 34 of the wiper driving arm to securely hold the wiper blade assembly on the wiper driving arm. Each spring leg 64 includes an end portion 72 adapted to be captured between the mounting block 62 and the bridge member 44, and an angularly turned terminus 74 adapted to be anchored in the mounting block.

The mounting block 62 comprises an elongated generally rectangular member positioned within the channel-shaped mid portion of the primary bridge member 44. In order to secure the mounting block to the bridge member, the mounting block includes a latch finger 76 extending upwardly at one end of the block through the aperture 68 in the bridge member and extending longitudinally from the aperture 68 to rest upon the crosspiece 46 of the bridge member. At the opposite end, the mounting block is secured to the bridge member 44 by a rivet or the like as illustrated at 78. It will be understood that in the process of assembly, before the rivet 78 is applied, the latch finger 76 of the mounting block may be inserted through the aperture 68 in the bridge member. The block may then be pivoted to the position illustrated best in FIGS. 2 and 3, after which the rivet 78 may be applied.

At opposite sides of the rivet 78, the mounting block 62 is formed with a pair of longitudinally extending grooves 80 in the upper surface of the block for receiving the end portions 72 of the wire spring, to capture the end portions 72 between the mounting block and the bridge member 44. In each groove 80 there is an intersecting aperture 82 for receiving the angularly bent spring terminus 74, so that the spring is anchored in the mounting block. The grooves 80 communicate respectively with longitudinally extending slots 84 which extend throughout the height of the mounting block for receiving the mid portions of the spring legs 64 in the vicinity of the reduced portion 36 of the tip 34 on the wiper driving arm. In order to accept the tip of the wiper driving arm, the mounting block includes a transverse bore 86 which provides additional support for the enlarged end portions 38 and 40 of the tip.

In use, the U-shaped spring member is securely attached to the bridge member 44 and the mounting block by virtue of the captured end portions 72 and the angularly bent ends 74. The captured portions 72 are disposed so that the mid portions 70 of the spring legs normally yieldably engage the reduced portion 36 of the tip, as shown in full lines in FIG. 3, in a manner to retain the wiper blade assembly on the tip of the driving arm. The central portions of the spring legs 64 are disposed in the longitudinally extending slots 84 so that lateral motion of the spring legs is restricted and the spring is thereby strengthened. When it is desired to remove the wiper blade assembly from the tip of the driving arm, the spring may be depressed to the broken line position shown in FIG. 3 by manual contact with the exposed end portion 66, so that the tip is released and the bridge member may be withdrawn from the tip. When the wiper blade assembly is to be attached to the tip of the driving arm, the spring may be depressed to the broken line position, or the beveled end portion 42 of the tip may be inserted through the apertures in the sides of the bridge member in a manner such that the spring is cammed aside as the tip passes toward the position illustrated in FIG. 2. The outboard end portion 40 of the tip of the driving arm has a length approximately corresponding to the lateral space between the legs 70 of the spring member, so that if the wiper blade assembly is only partly mounted on the tip of the driving arm, the end portion 40 may be captured between the spring legs 70 to retain the wiper blade assembly against loss even though improperly mounted. The device thus provides a fail-safe feature which reduces losses sometimes experienced with prior art devices. The wiper blade assembly is operative as a wiper even though the end portion 40 is inadvertently left between the two legs 70 of the spring. Frequently, in the automotive assembly operation an assemblyman will push the wiper blade onto the tip 34 and as soon as he hears a click he will release the arm and blade onto the windshield and move on to the next car. With the two legged spring latch, the wiper will be operative even with the end portion 40 between the two legs. The prior flat spring gave a click when the end portion 40 went past the shoulder on the one side of the bridge of the wiper such that if left in that position the blade would fly off as soon as the wiper arm started to accelerate on its first stroke. The present construction completely overcomes the failure due to only partial assembly of the blade.

We claim:

1. A windshield wiper blade assembly releasably mountable on the side of a wiper driving arm having a laterally extending pin with a reduced central portion between an enlarged outer end and an enlarged inner end comprising;
   a. a pressure distributing wiper yoke member having a channel-shaped midportion with parallel sides having aligned apertures for receiving the enlarged ends of the laterally extending pin,
   b. a mounting block secured in the channel-shaped midportion and having an aperture aligned with the apertures in the sides of the yoke member, and
   c. a U-shaped spring member having parallel spaced apart legs with the free ends of said legs secured in the mounting block, midportions of said legs extending across the aperture in said mounting block and bearing on the reduced portion of the pin, and a connecting crosspiece at the opposite end of the legs adapted to be depressed for moving the midportions of the spring out of alignment with the apertures to release the pin for removal of the yoke and whereby the enlarged outer end of the pin may be positioned between said spaced apart legs with one leg engaging in the reduced central portion of the pin to hold the blade on said driving arm.

2. A windshield wiper blade assembly as defined in claim 1, wherein the mounting block has spaced parallel grooves housing the midportions of the spring legs to restrict lateral movement of the legs.

3. A windshield wiper blade assembly as defined in claim 1, wherein the length of the outboard enlarged end of the pin is approximately equal to the space between the spring legs.

* * * * *